Oct. 1, 1957 J. P. ECKERT, JR 2,808,520

BIPOLAR OUTPUT CARRIER MAGNETIC AMPLIFIER

Filed April 5, 1955

Bipolar Output-Arbitrary Level Referred To Ground

INVENTOR

JOHN PRESPER ECKERT, JR.

BY Charles C. English

AGENT

United States Patent Office 2,808,520

Patented Oct. 1, 1957

2,808,520

BIPOLAR OUTPUT CARRIER MAGNETIC AMPLIFIER

John Presper Eckert, Jr., Philadelphia, Pa., assignor to Sperry Rand Corporation, New York, N. Y., a corporation of Delaware Application April 5, 1955, Serial No. 499,373

14 Claims. (Cl. 307—88)

The present invention relates to bipolar output carrier magnetic amplifiers.

It is an object of the invention to obtain outputs of two polarities from a self-saturating magnetic amplifier with only one output winding.

It is an object of the invention to provide a simple circuit for obtaining dual polarity outputs from carrier type magnetic amplifiers.

It is an object of the invention to provide a bipolar output carrier magnetic amplifier in which the carrier frequency output is shifted in the direct current level by being coupled with a circuit which does not transmit the original D. C. components, the output being rectified for the desired polarity. The coupling means employed in the circuit may be a blocking condenser, a transformer, a high-pass or band-pass filter, or other known devices having similar properties.

It is an object of the invention to provide for the utilization of signal input frequency components in the output of a self-saturating carrier type magnetic amplifier with subsequent rectification and filtering.

Reference is made to my prior copending application Serial No. 446,095, filed July 27, 1954, entitled "Magnetic Amplifier and Flip-Flop Circuit Embodying the Same," and to the prior copending application Serial No. 459,631, filed October 1, 1954, for "Single-Ended Carrier Type Magnetic Amplifier Bistable Device," for a description of the construction and mode of operation of single-ended carrier type magnetic amplifiers. The present invention employs means connected to the output of the amplifier which utilizes the pulsating character of that output to produce two output signals, one of which is positive going and the other of which is negative going with respect to a datum potential.

Reference is had to the drawing, in which like numerals refer to like parts throughout.

Figure 1:
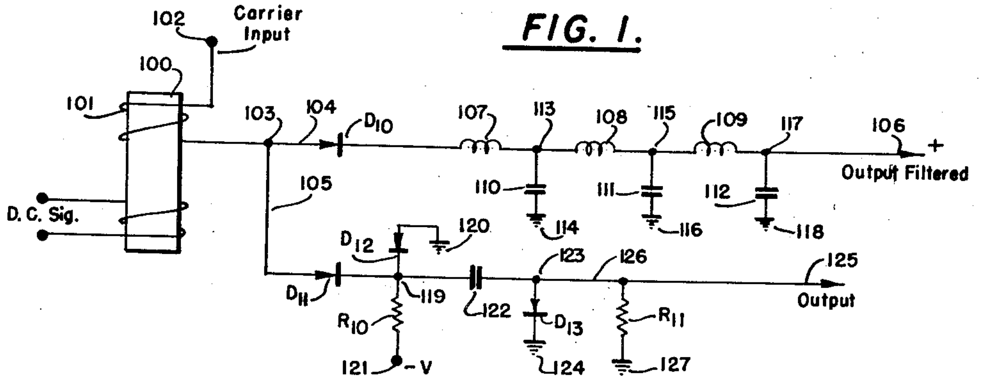
Figure 1 is a schematic circuit diagram of one form of the invention.

Referring now to Figure 1, it will be seen that a magnetic core 100 is provided with a carrier input winding 101, one end of the winding having an input terminal 102 and the other end being connected to junction 103. Junction 103 is connected by wire 104 to the anode of diode D10. Wire 105 connects junction 103 to the anode of diode D11. The cathode of diode D10 is connected to output 106 having positive polarity through an exemplary filter comprising coils 107, 108 and 109, with their corresponding condensers 110, 111 and 112. Condenser 110 has one terminal connected to junction 113 between coils 107 and 108 and its other terminal grounded at 114. Condenser 111 has one terminal connected to junction 115 between coils 108 and 109, and its other terminal is grounded at 116. Condenser 112 has one terminal connected to junction 117 between coils 109 and output terminal 106. The other terminal of condenser 112 is grounded at 118. The cathode of diode D11 is connected to junction 119. Junction 119 is connected to the cathode of diode D12, the anode of which is grounded at 120. The junction 119 is connected to a source of negative potential −V at terminal 121 through resistor R10. Junction 119 is also connected to one terminal of a condenser 122, the other terminal of which is connected to the anode of diode D13 at junction 123. The cathode of diode D13 is grounded at 124. Junction 123 is connected to output terminal 125 by wire 126 which is grounded at 127 through exemplary load resistor R11.

Figure 2:
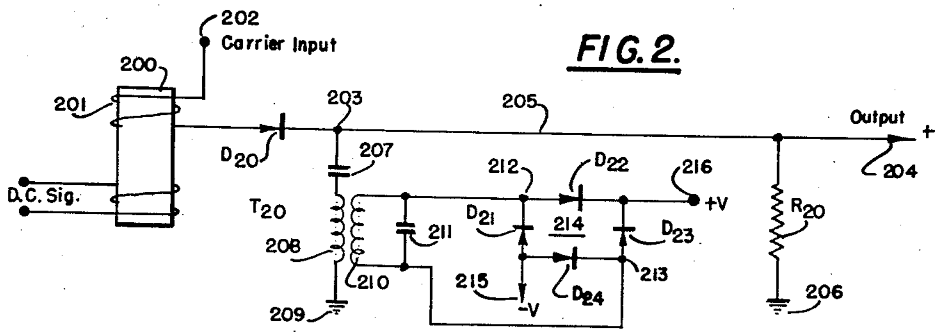
Figure 2 is a schematic circuit diagram of another form of the invention.

Figure 2 shows a different form of the invention, providing bipolar output at an arbitrary level with reference to ground. A magnetic core 200 is again provided, with a carrier input winding 201 having an input terminal 202. The other end of winding 201 is connected to the anode of diode D20, the cathode of which is connected to junction 203. Junction 203 is connected to output terminal 204 by wire 205 which is grounded at 206 through exemplary load resistor R20. Junction 203 is connected to one terminal of condenser 207, the other terminal of which is connected to one terminal of the primary 208 of transformer T20. The other terminal of primary 208 is grounded at 209. Secondary 210 of transformer T20 has its terminals connected across a condenser 211 and thence to junctions 212 and 213 of bridge rectifier 214. Diode bridge 214 comprises diodes D21, D22, D23 and D24. Junction 212 is connected to the cathode of diode D21 and to the anode of diode D22. Junction 213 is connected to the cathode of diode D24 and to the anode of diode D23. The anodes of diodes D21 and D24 are connected to terminal 215; providing a negative going output from an arbitrary level referred to ground. The cathodes of diodes D22 and D23 are connected to terminal 216, which is connected to potential +V to provide the reference potential for the negative going output at terminal 215.

Figure 3:
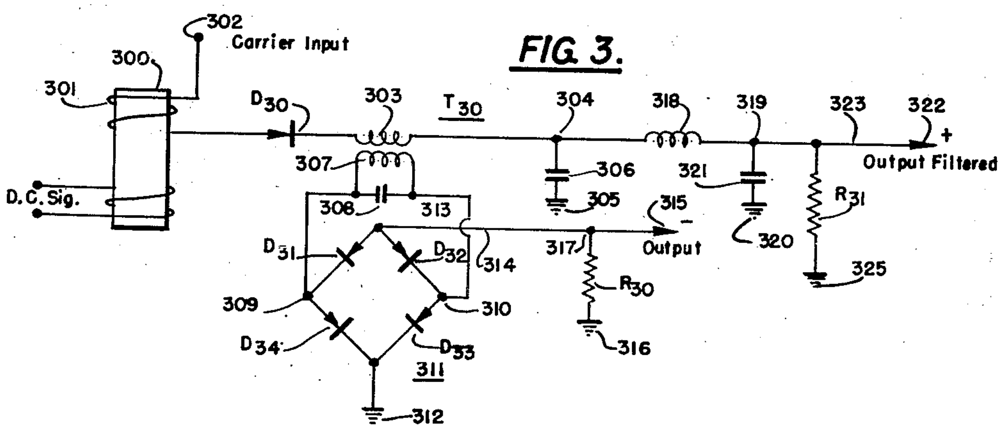
Figure 3 is a schematic circuit diagram of a third form of the invention.

Figure 3 shows a variant of the structure in Figure 2, employing a bridge rectifier in a somewhat different manner. A magnetic core 300 is provided, with a carrier input winding 301 connected to a carrier input terminal 302 and its opposite end connected to the anode of diode D30. The cathode of diode D30 is connected to one terminal of primary 303 of transformer T30. The other terminal of primary 303 is connected to junction 304 which is connected to ground at 305 through condenser 306. Secondary 307 of transformer T30 has its terminals connected across a condenser 308 and to junctions 309 and 310 of bridge rectifier 311. Bridge rectifier 311 comprises diodes D31, D32, D33 and D34. The cathode of diode D31 and the anode of diode D34 are connected to junction 309. The cathode of diode D32 and the anode of diode D33 are connected to junction 310. Diodes D33 and D34 have their cathodes grounded at 312. Diodes D31 and D32 have their anodes connected to junction 313 with wire 314, leading to negative output terminals 315. Wire 314 is connected to ground at 316 through load resistor R30, connected to junction 317. Junction 304 is connected to one terminal of inductance 318, the other terminal of which is connected to junction 319. Junction 319 is connected to ground at 320 through condenser 321, and to output terminal 322, of positive polarity, by wire 323, containing a junction 324 which is grounded at 325 through load resistance R31. Elements 306, 318 and 321 comprise an exemplary low pass filter.

Referring again to Figure 1, the operation of the device is as follows. The carrier input may be a square wave or other alternating current waveform in which positive excursions thereof are fed through the power winding 101 and unilateral elements D10 and D11 to magnetize the core in one sense. The signal winding which is also wound on the core is adapted to be fed with signal pulses which are of long duration as compared with the period of the carrier pulses and which operate to magnetize the core in a sense opposite to said one sense. In the absence of an input at the signal winding, the carrier pulses, flowing through coil 101, and unilateral elements D10 and D11 will drive the core 100 to positive saturation and therefore coil 101 will have low impedance and the carrier pulses will readily flow therethrough. In event a signal is impressed on the signal winding, it will apply a negative magnetizing force to the core which will drive it negatively during the spaces between positive going carrier pulses. The positive going portions of the carrier pulses, however, will overcome the negative magnetizing forces of the signal winding and will magnetize the core positively. Consequently, during the presence of an input signal, the core magnetization will be alternately driven positively and negatively, and will always remain on unsaturated portions of the hysteresis loop, in which case the coil 101 will have high impedance and there will be very little output at the load.

The way that the device produces signals of opposite polarity at its output in the absence of an input signal, is as follows. In the arrangement of Figure 1, carrier input signals effect current flow through coil 101, saturating the core 100 and raising the terminal 103 to a positive value. Current therefore readily flows through rectifier D10, through the output filter to the output terminal 106. Hence, a positive signal appears at that output. Since the pulsating carrier current also flows through rectifier D11, it raises terminal 119 from ground, so that current flows through condenser 122, rectifier D13 to ground 124. As the pulsating direct currents approach their peak values, the condenser 122 becomes highly charged, with the left-hand plate being positive. However, during the time that the waveform is sharply rising, as aforesaid, the current passing through the condenser 122 always flows through rectifier D13 to ground 124 and therefore does not affect the potential at the output 125. At the end of each pulsation of the direct current, the potential on wire 103 approaches zero and current flow in the path 120, D12, R10, 121 reduces the potential at junction 119 to zero. Since condenser 122 has its left-hand plate charged positively relative to its right-hand plate, and since the left-hand plate of capacitor 122 is at zero potential, it therefore drives wire 126 negatively and produces a negative signal at the output 125.

Therefore, positive and negative signals appear respectively at the outputs 106 and 125 whenever there is no input signal applied to the signal winding. In event a signal appears at the signal winding, the potential at outputs 125 and 106 drops to zero.

In Figure 2, assume that no signal is applied to the signal winding; in this case, current from carrier input 202 flows through coil 201, saturates the core 200 and causes a flow of current through diode D20 to output 204. Hence, a positive pulse appears at that output. The pulsating current divides at terminal 203, flows through condenser 207, transformer primary 208, to ground 209. This induces a potential in secondary 210 which is filtered by condenser 211 and is applied to the full wave bridge rectifier 214. The output terminal 215 of said rectifier is negative with respect to the terminal 216, and therefore, if, for instance, the latter is grounded the terminal 215 will produce a negative signal while the terminal 204 produces a positive signal. Therefore, as in the case of Figure 1, in the absence of an input at the signal winding, there will be outputs 204 and 215 of opposite polarity.

In Figure 3, in the absence of a signal at the input winding, pulses from the carrier input flow through coil 301 and saturate core 300. Consequently, coil 301 has low impedance to the flow of current through rectifier D30, primary 303, through the filter to the output terminal 322. This produces a positive output. The negative output is produced by virtue of induction of potential in the secondary 307, which may be filtered by element 308, the output of which is fed to the full wave bridge rectifier 311. One output terminal of the full wave rectifier is grounded at 312 and the other terminal 313 is connected by wire 314 to output terminal 315 and produces a negative output signal. Load resistors R30 and R31 may be added if desired. As in the case of Figures 1 and 2, there are positive and negative outputs 322 and 315, respectively, whenever the coil 301 has low impedance; and there is no output at either of the two output terminals when there is a large signal at the input winding.

While there have been described above what are at present believed to be the preferred forms of the invention, the appended claims are intended to include all variations thereof which fall within the true spirit of the invention.

I claim:

1. In a bipolar output carrier magnetic amplifier, a core of magnetic material having an input winding and a single output winding thereon, means for selectively impressing a signal on said input winding, a carrier source having a repetition rate appreciably in excess of said signal, said carrier source being coupled to one end of said output winding, an output circuit having two output branches, means connecting said output circuit to the other end of said output winding, coupling means in a selected one of said output branches for blocking D. C. components of said carrier source in said selected output branch, and means coupled to the output of said coupling means in said selected output branch for shifting the potential level of signals in said selected branch relative to signals appearing in the other of said output branches whereby output signals appearing in said two output branches are of opposite polarity to one another.

2. The combination set forth in claim 1, in which said coupling means comprises a condenser.

3. The combination set forth in claim 1, in which said coupling means comprises a transformer.

4. In a bipolar output carrier magnetic amplifier, a core of magnetic material, a single output winding on said core, a carrier frequency source coupled to one end of said output winding, an input winding on said core for controlling the flow of energy from said carrier source through said output winding, a circuit having two independent branches, means connecting said circuit to the other end of said output winding whereby energy from said source is selectively coupled via said output winding to both said branches simultaneously, and means in one of said branches for shifting the potential level of signals therein relative to signals in the other of said branches, thereby to effect signals of different relative polarities in said two output branches.

5. The combination set forth in claim 4 wherein said last-named means includes a transformer having its primary winding coupled to said other end of said output winding, said transformer having a secondary winding, and rectifier means connected to said secondary winding.

6. In a carrier type magnetic amplifier, a core of magnetic material, an output winding thereon, signal input means controlling the portion of the hysteresis loop upon which the core operates, a source of carrier pulses connected to one end of said output winding, and means connected to the other end of said winding and responsive to the pulsating character of the current passing through the said output winding to produce simultaneously to independent output signals of different polarities respectively.

7. A carrier magnetic amplifier having two outputs comprising a core of magnetic material, a power winding thereon, a source of carrier pulses, said source having two output terminals one of which is connected to one end of the power winding, rectifier means connected to the other end of the power winding for providing an output signal of one polarity, a series circuit including a first rectifier, a condenser and a second rectifier, said series circuit being connected between the output of the power winding and the other terminal of said source, the rectifiers in said series circuit being connected in the same sense, and a second output terminal being connected to that end of the condenser which is connected to said last-named rectifier.

8. A carrier type magnetic amplifier comprising a core, a power winding on the core, means for controlling the resetting of the core to thereby determine the impedance of the power winding, a source of carrier pulses connected to one end of the said power winding, rectifier means connected to the other end of the said power winding for producing an output signal of one polarity, a condenser, and means connected to the other end of the power winding for charging the condenser as the pulses of current in said power winding increase in value, and connecting the condenser so that one of its electrodes will have a polarity different from that of said output when the pulses of current are of minimum value, and another output connected to said electrode of said condenser.

9. A magnetic amplifier comprising a core of magnetic material having an input winding and a power winding thereon, a varying source of power coupled to one end of said power winding, signal means coupled to said input winding for controlling the flow of energy from said power source through said power winding, an output circuit coupled to the other end of said power winding, said output circuit including two substantially parallel branches each of which is responsive to energy passing from said power source through said power winding, and means for shifting the level of potentials in one of said branches relative to potentials in the other of said branches whereby said two branches produce two different outputs of different polarities respectively.

10. The combination of claim 9 including a rectifier for coupling one of said branches to said other end of said power winding, and means including a coupling capacitor for coupling the other of said branches to said other end of said power winding.

11. The combination of claim 9 including a rectifier for coupling one of said branches to said other end of said power winding, and means including a transformer for coupling the other of said branches to said other end of said power winding.

12. A magnetic amplifier comprising a core of magnetic material having an input winding and a power winding thereon, means for selectively applying control signals to said input winding, a carrier source having a repetition rate substantially in excess of said control signals, means coupling said carrier source to one end of said power winding, an output circuit coupled to the other end of said power winding and responsive to pulses from said carrier source passing via said power winding, said output circuit having two distinct output terminals, said output circuit further having means for varying the relative polarities of signals appearing at said output terminals thereby to produce two substantially independent outputs of opposite polarity in response to pulses from said carrier source.

13. The combination of claim 12 wherein said two output terminals are included in two substantially parallel circuit branches in said output circuit, and coupling means in one of said branches for preventing the passage of D. C. signal components from said power winding to said one of said branches.

14. The combination of claim 13 wherein said coupling means includes a transformer, and a rectifier coupled to the output of said transformer.

References Cited in the file of this patent

UNITED STATES PATENTS 2,709,798 Steagall ---------------- May 31, 1955

OTHER REFERENCES

"Electronics," June 1953 pp. 161–163, "Magnetic Amplifier with Reset Control."